United States Patent [19]
Adachi

[11] Patent Number: 5,350,951
[45] Date of Patent: Sep. 27, 1994

[54] VOLTAGE CHANGE CIRCUIT FOR A MICROCOMPUTER

[75] Inventor: Kiyoshi Adachi, Hyogo, Japan

[73] Assignee: Mitsubishi Denki Kabushiki Kaisha, Tokyo, Japan

[21] Appl. No.: 922,125

[22] Filed: Jul. 29, 1992

[30] Foreign Application Priority Data

Oct. 7, 1991 [JP] Japan .................................. 3-287090

[51] Int. Cl.⁵ ...................... H03K 17/16; H03K 17/06
[52] U.S. Cl. ................................ 307/296.4; 307/243;
307/296.5; 307/572; 307/576; 365/185
[58] Field of Search ................... 307/243, 296.4, 296.5,
307/468, 469, 571, 572, 576; 365/185, 226

[56] References Cited

U.S. PATENT DOCUMENTS

| | | | |
|---|---|---|---|
| 4,689,504 | 8/1987 | Raghunathan et al. ............. | 307/449 |
| 4,694,430 | 9/1987 | Rosier ................................ | 365/226 |
| 4,835,423 | 5/1989 | de Ferron et al. .................. | 307/584 |
| 4,876,462 | 10/1989 | Kobatake et al. ................... | 307/572 |
| 4,893,275 | 1/1990 | Tanaka et al. ...................... | 365/185 |
| 4,937,787 | 6/1990 | Kobatake ........................... | 365/94 |
| 5,109,257 | 4/1992 | Kondo ................................ | 365/185 |
| 5,214,327 | 5/1993 | Saeki et al. ......................... | 307/465 |

Primary Examiner—Timothy P. Callahan
Assistant Examiner—Terry D. Cunningham
Attorney, Agent, or Firm—Townsend and Townsend Khourie and Crew

[57] ABSTRACT

A microcomputer including first, a voltage change circuit which includes circuitry for selecting one of two voltages applicable to a PROM and, second, leak current prevention circuitry for preventing a current from leaking from a first terminal at a first voltage through first and second switching elements to a second terminal. The leak current prevention circuitry can be a transistor whose source, drain and gate are tied to the first terminal, to the gate of the second switching element and to the second terminal, respectively. The leak current prevention circuitry operates to cut off the second switching element which the voltage at the second terminal is zero. The circuitry for selecting can be two series circuit, each consisting of a diode and two transistors. The series circuits are interconnected and responsive to a voltage selecting signal.

3 Claims, 4 Drawing Sheets

VOLTAGE CHANGE CIRCUIT FOR A MICROCOMPUTER

BACKGROUND OF THE INVENTION

Detailed Description of the Invention

1. Field of the Invention

The present invention relates to a microcomputer capable of preventing leak current produced due to the variation of finished parameters represented by transistor characteristics generated in manufacturing semiconductor products.

2. Description of the Prior Art

An existing microcomputer storing an EPROM (erasable programmable ROM; hereafter referred to as EPROM) has a mode called EPROM mode for writing data in the stored EPROM. The existing microcomputer is designed so that the functions of terminals of the microcomputer will be equivalent to those of the EPROM only and data can be read or written by a general EPROM writer in the EPROM mode. FIG. 3 shows an internal block diagram of the microcomputer in the EPROM mode, where a CPU (central processing unit), RAM (random access memory), and peripheral circuits are omitted because they are separated from the address bs and data bus in the EPROM mode. In FIG. 3, number 1 is a Vcc terminal (first terminal), 2 is a Vpp terminal (second terminal), 3 is a voltage change circuit, 4 is an EPROM control circuit, 5 is a read/write circuit of an EPROM, 6 is the EPROM, 7 is an address decoder circuit, 8 is an address bus, 9 is a data bus, 10 is an EPROM control terminal, 11 is a data input/output terminal, and 12 is an address input terminal. Arrows in FIG. 3 indicate signal flow.

The following is the description of operations in the EPROM mode of the existing microcomputer. When the write voltage Vpp is applied to the Vpp terminal 2, a setting signal thereafter referred to as PGM) (this signal changes from Low level to High level) for executing write setting for the EPROM 6 is outputted to the voltage change circuit 3 and read/write circuit 5 from the EPROM control circuit 4 by setting conditions for writing data in in the internal EPROM to the EPROM control terminal 10. According to the outputted signal, the voltage change circuit 3 in FIG. 4 changes the voltage level of the signal wire C serving as a common wire from from the driving voltage Vcc to the write voltage Vpp and the read/write circuit 5 writes data in the EPROM 6.

The following is the description of the operations of the voltage change circuit 3 by referring to FIG. 4. First, the case is described in which the write voltage Vpp is applied to the Vpp terminal. The threshold values of P-channel transistor, N-channel transistor, and diode are assumed as Vtp, Vtn, and Vtd respectively. And, Va through Vf are assumed as the potential of signal wires "a" through "f" respectively. Because PGM is at Low level in reading data, the N-channel transistor Tr6 is turned off and thereby, the P-channel transistor Tr4 is turned on. In this case, the potential of each signal wire is shown as follows: Va=Vpp−Vtd, Vb=0, Vc=Vcc, Vd=Vpp−Vtd, Ve=Vcc, and Vf=PGM=0.

Because PGM is at High level (at drive voltage Vcc) in writing data, the N-channel transistor Tr6 is turned on and thereby, the P-channel transistor Tr3 is turned on. Also, the N-channel transistor Tr5 is turned off and thereby the P-channel transistor Tr4 is turned off. In this case, the potential of signal wires "a" through "f" is shown as follows:

Va=0, Vb=Vpp−Vtd, Vc=Vpp, Vd=Vpp−Vtd, Ve=0, and Vf=PGM=Vcc. As described above, the potential Vc of the signal wire C serving as a common wire changes to the drive voltage Vcc or write voltage Vpp according to Low or High level of PGM.

Problems to Be Solved by the Invention

For the existing microcomputer storing an EPROM, the Vpp terminal as the second terminal is used in common with a terminal having any function of the microcomputer even if the microcomputer is operated in the EPROM mode. Therefore, in the microcomputer, Low level or 0 V may be applied to the Vpp terminal which is not present in the simple EPROM. However, the Vpp terminal is actually present in the simple EPROM as an exclusive terminal and the lower limit of the level of Vpp is assumed as Vcc.

The following is the description of the operations of a power-supply change circuit when 0 V is applied to a terminal serving as the Vpp terminal in the EPROM mode of the microcomputer by referring to FIG. 4. In this case, PGM comes to 0 V because of the circuit configuration in which it is not generated unless the voltage level of the Vpp terminal reaches the drive voltage Vcc or higher. Under these conditions, the potential of signal wires "a" through "f" is shown as follows: Va=Vcc−Vtd, Vb=0, Vc=Vcc, Vd=Vcc−Vtd, and Ve=Vcc. In this case, Vgs (voltage between gate and source) of the P-channel transistor Tr2 comes to −Vtd. However, when |Vtd| becomes equal to or larger tan |Vtp|, the P-channel transistor Tr2 is turned on and current flows from the Vcc terminal to the Vpp terminal through the P-channel transistor Tr1 and the signal wire C. This increases the supply current of the microcomputer. Especially, the current under the standby state (state in which all functions of the microcomputer are stopped) becomes excessive, resulting in a critical trouble of the product.

SUMMARY OF THE INVENTION

Object

The present invention is made to solve the above problems and it is an object of this invention to provide a microcomputer having a circuit for preventing current from leaking to the Vpp terminal from the Vcc terminal.

Means for Solving the Problems

In the microcomputer of the first invention provided with at least a voltage change circuit comprising the first switching element (P-channel transistor Tr1) for feeding the drive voltage Vcc to be fed to the first terminal (Vcc terminal 1) and to drive the microcomputer to the common wire (signal wire C), the second switching element (P-channel transistor Tr2) for feeding a write voltage to be fed to the second terminal (Vpp terminal 2) and higher than the above drive voltage to the common wire, and the selecting means W for selecting either of the above first and second switching elements to turn it on, and and EPROM from which already written data can be read by the drive voltage and in which external data can be written by the write voltage; the leak current preventing means 15 is included which prevents current from flowing to the second terminal side through the second switching element in accordance with the drive voltage applied to the common wire when the above first switch element is on and the above second switching element is off, as shown in FIG. 1.

In the microcomputer of the second invention, the above leak current preventing means comprises a transistor (P-channel transistor Tr7) which is connected between the first terminal and the second-switching-element control input side and turned on to cut off the second switching element when the voltage of the second terminal is 0, as shown in FIG. 2.

In the microcomputer of the third invention, the above selecting means W has the first series circuit W1 in which the voltage fed to the above first terminal is earthed through the first diode for preventing backflow (diode D1), third transistor (P-channel transistor Tr3), and fifth transistor (N-channel transistor Tr5), and the second series circuit W2 in which the voltage fed to the above second terminal is earthed through the second diode for preventing backflow (diode D2), fourth transistor (P-channel transistor Tr4), and sixth transistor (N-channel transistor Tr6), as shown in FIG. 2.

Functions

The microcomputer of the first invention prevents current from leaking to the second terminal side from the first terminal side by the leak current preventing means by raising the gate potential of the second switching element up to the drive voltage Vcc and completely cutting off the second switching element when 0 V is applied to the second terminal.

The microcomputer of the second invention prevents current from leaking by the leak current preventing means comprising a transistor by turning on the transistor to completely cut off the second switching element when the second terminal is 0 V and cutting off the transistor when the drive voltage is applied to the second terminal.

The microcomputer of the third invention is connected so that the above selecting means turns on the fourth transistor when the fifth transistor is turned on and turns on the third transistor when the sixth transistor is turned on and configured so that it turns on the sixth transistor by the external EPROM write setting signal and turns it off by controlling the fifth transistor through an inverter, which turns off the first transistor when the fifth transistor is turned on and turns off the second transistor when the sixth transistor is turned on.

The above and other objects, features, and advantages of the invention will become more apparent from the following description when taken in conjunction with the accompanying drawings.

DESCRIPTION OF THE PREFERRED EMBODIMENT

Figure 1:
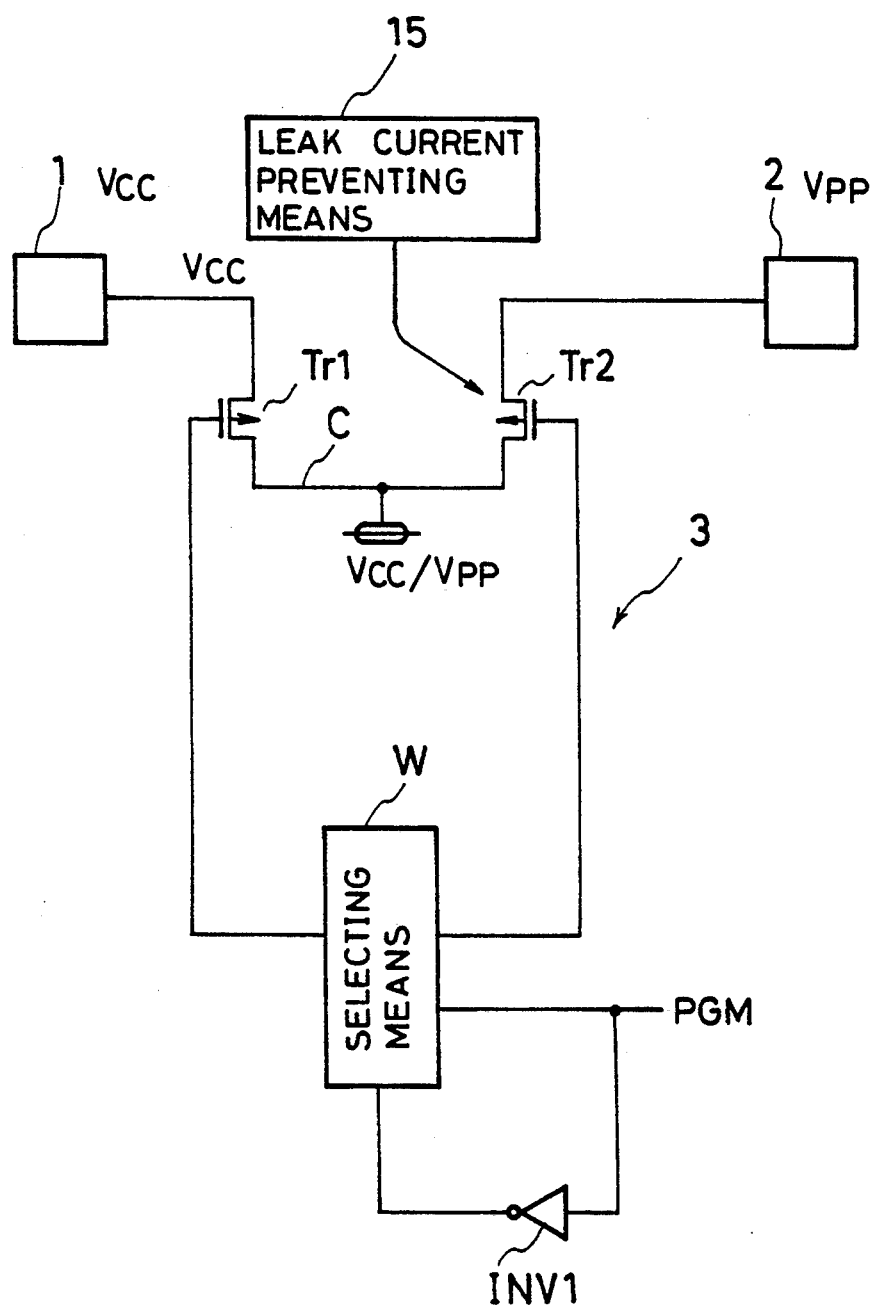
FIG. 1 is a block diagram of the voltage change circuit in accordance with an embodiment of the first invention.
Figure 3:
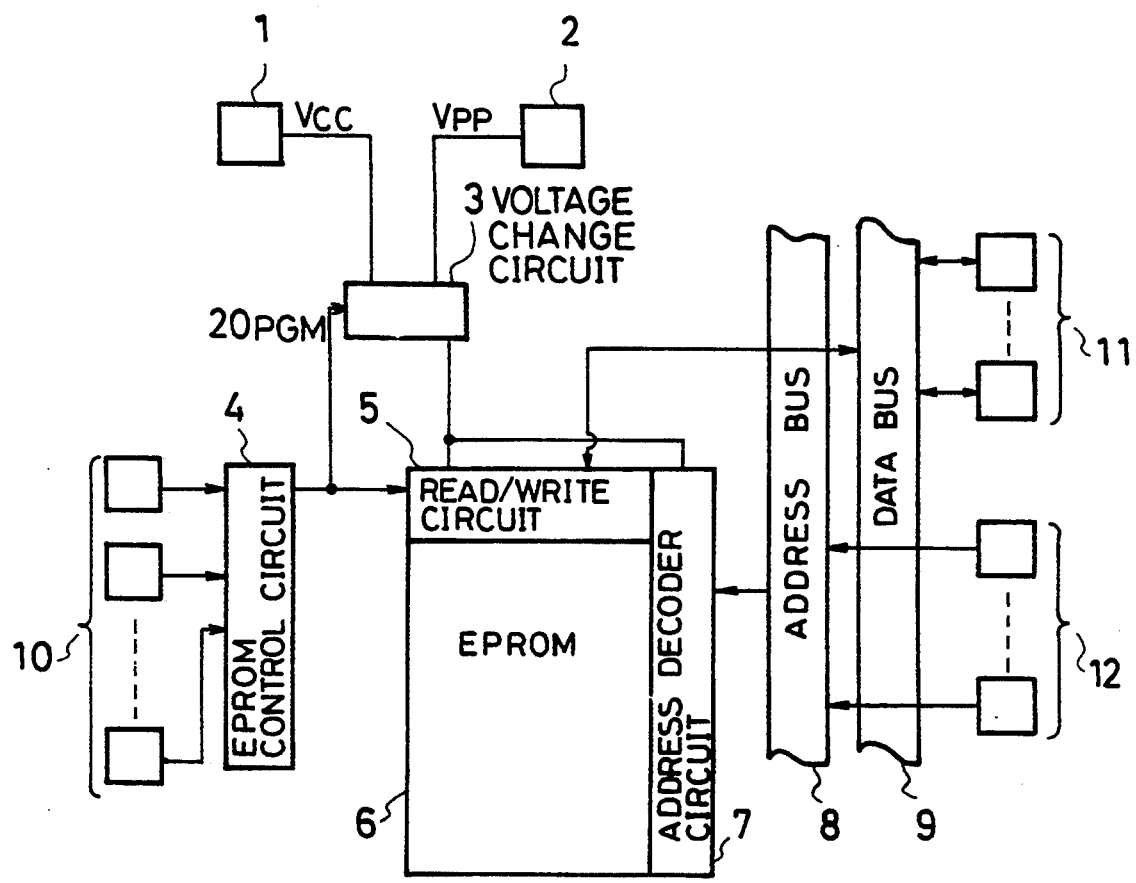
FIG. 3 is a block diagram of the microcomputer storing the circuit in FIG. 1 or FIG. 2.
Figure 4:
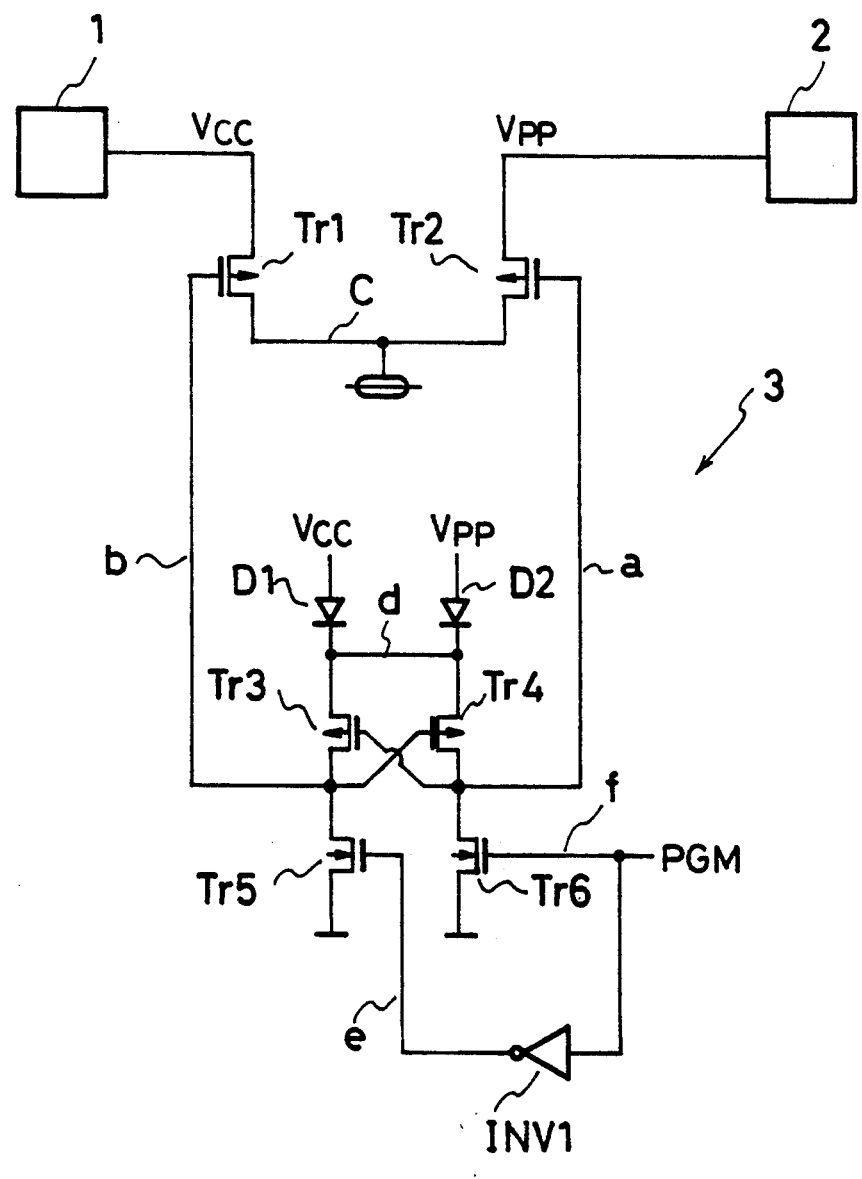
FIG. 4 is a diagram of the voltage change circuit showing an example of the prior art.

An embodiment of the present invention is described below by referring to the drawings. FIG. 1 is a circuit block diagram showing an embodiment of the first invention. In FIG. 1, numeral 1 is a Vcc terminal serving as a first terminal, 2 is a Vpp terminal serving as a second terminal, 3 is a voltage change circuit, and 15 is leak current preventing means, and C is a signal wire serving as a common wire, W is a selecting means, Tr1 and Tr2 are P-channel transistors serving as a first switching element and second switching element respectively, and INV1 is an inverter. The voltage change circuit 3 corresponds to the previously-mentioned voltage change circuit in FIG. 3. The terminals 1 and 2, Tr1 and Tr2, and INV1 have the same functions as the existing ones (FIG. 4). Therefore, they are provided with the same symbols and their description is omitted.

The leak current preventing means 15 prevents current form leaking to the Vpp terminal side form the P-channel transistor Tr1 through the P-channel transistor Tr2 in accordance with the drive voltage Vcc generated on the signal wire C when the P-channel transistor Tr1 is on and the P-channel transistor Tr2 is off. The microcomputer of the first invention prevents current from leaking to the Vp terminal 2 from the Vcc terminal 1 by the leak current preventing mean 15 by raising the gate potential of the P-channel transistor Tr2 up tot he drive voltage Vcc and completely cutting off the potential of the P-channel transistor Tr2.

Figure 2:
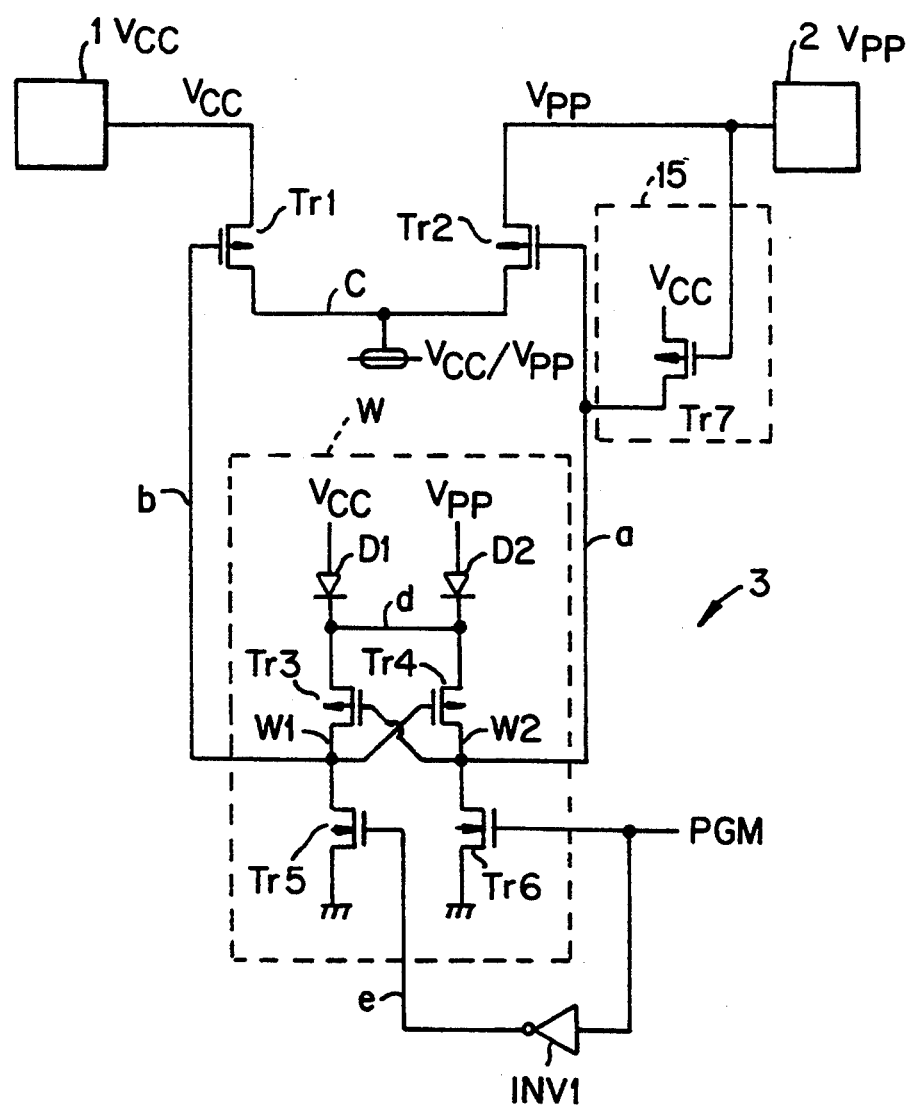
FIG. 2 is a diagram of the voltage change circuit in accordance with an embodiment of the second and third inventions.

FIG. 2 is a circuit diagram showing the embodiment of the second and third inventions. For the microcomputer of the second invention, the leak current preventing means 15 is composed of one transistor. In FIG. 2, Tr7 is a P-channel transistor. For the P-channel transistor Tr7, the source is connected with the drive voltage Vcc, the gate is connected with the Vpp terminal 2 and the source of the P-channel transistor Tr2, and the drain is connected with the gate of the P-channel transistor Tr2.

For the microcomputer f the third invention, the selecting means W is configured as shown in FIG. 2. In FIG. 2, D1 and D2 are a backflow preventing diode, Tr3 and Tr4 are a P-channel transistor, Tr5 and Tr6 are an N-channel transistor, "a", "b", "d", and "e" are a signal wire, and others are the same as those in FIG. 1. For the diode D1, the anode is connected with the drive voltage Vcc and the cathode is connected with the cathode of the diode D2 and the sources of the P-channel transistor Tr3 and Tr4. For the diode D2, the anode is connected with the write voltage Vp. For the P-channel transistor Tr3, the gate is connected with that of the P-channel transistor Tr2 and the drain is connected with that of the N-channel transistor Tr5. For the P-channel transistor Tr4, the gate is connected with that of the P-channel transistor Tr1 and the drain is connected with that of the N-channel transistor Tr6. For the N-channel transistor Tr5, the gate is connected with the output of the inverter INV1 and PGM. Therefore, the diode D1, P-channel transistor Tr3, and N-channel transistor Tr5 constitute the first series circuit W1, and the diode D2, P-channel transistor Tr4, and N-channel transistor Tr6 constitute the second series circuit W2.

The operations of the present invention are described below by referring to FIG. 2. As already described in FIG. 3, the drive voltage Vcc from the Vcc terminal 1 or the write voltage Vpp from the Vpp terminal 2 is fed to the EPROM 6 by changing the voltage by the voltage change circuit 3. When the write voltage Vpp is applied to the Vpp terminal 2, the N-channel transistor Tr6 is turned off and thereby, the P-channel transistor Tr3 is turned off and thereby, the P-channel transistor Tr3 is turned off because PGM is at Low level in reading data. In this case, the N-channel transistor Tr5 is turned on and thereby, the P-channel transistor Tr4, and Tr1 are turned on. When the write PGM is at High level, the N-channel transistor Tr6 is turned on and thereby, the P-channel transistor Tr3 is turned on. In this case, the N-channel transistor Tr5 is turned off and thereby, the P-channel transistors Tr4, and Tr1 are turned off.

The potential of each portion is as follows when the write voltage Vpp of the Vpp terminal 2 equals 0 V and PGM equals 0 V regardless of the threshold value Vtd of diodes and the threshold value Vtp of P-channel transistors because the P-channel transistor Tr7 is turned on:

Va=Vcc, Vb=0, Vc=Vcc, Vd=Vcc, Ve=Vcc, and Vf=PGM=0. Therefore, when the P-channel transistor Tr2 is cut off, no current leaks from the Vcc terminal 1 to the Vpp terminal 2 through the P-channel transistor Tr2. When the Vpp terminal has the write voltage Vpp, the P-channel transistor Tr7 is cut off and therefore, the state without the P-channel transistor Tr7 appears, that is, the circuit is equivalent to the existing circuit.

Advantages of the Invention

The first invention has an advantage that the current produced due to the process parameter variation ($|Vtd| \geq |Vtp|$) can be prevented from leaking to the second terminal from the first terminal through the common without changing the functions and characteristics o the existing power-supply change circuit because the leak current preventing means is included.

The second invention has an advantage that integrated circuits can easily be configured because the leak current preventing means consists of only transistors, in addition tot he advantage of the first invention.

The third invention has an advantage that integrated circuits can easily be configured because the selecting means is composed of diodes and transistors.

What is claimed is:

1. A voltage change circuit for a microcomputer comprising:
   a first terminal driven at a first voltage;
   a first switching element, coupled to said first terminal and to a common wire, for switching said first voltage to said common wire;
   a second terminal driven at a second voltage, said second voltage being one of 0 volts and a voltage higher than said first voltage;
   a second switching element, coupled to said second terminal and to said common wire, for switching said second voltage to said common wire, said second switching element having a control input; and
   selecting means, coupled to said first and second switching elements, for closing a selected one of said first and second switching elements, and
   leak current preventing means, receiving said second voltage as input and coupled to said second switching element, for generating a leak current preventing signal for said control input of said second switching element, said leak current preventing signal for preventing said second switching element from closing when said second voltage is 0, preventing current from flowing to said second terminal through said second switching element.

2. The voltage change circuit of claim 1, wherein:
   said leak current preventing means comprises a transistor whose gate is tied to said second terminal and whose source is tied to said first terminal; and
   said transistor closes to cut off said second switching element when said second voltage is 0.

3. The voltage change circuit of claim 1, wherein:
   said first and second switching elements comprises first and second transistors, respectively;
   said selecting means comprises:
      an input for a voltage select signal;
      an inverter, receiving as input said voltage select signal;
      third through sixth transistors;
      a first series circuit comprising:
         a first diode, whose anode is tied to said first voltage terminal, said first diode for preventing backflow;
         said third transistor, whose source is tied to the cathode of said first diode, whose control input is tied to the drain of said sixth transistor, and whose drain is tied tot he control input of said first transistor; and
         said fifth transistor, whose drain is tied to the drain of said third transistor, whose control input is tied to the output of said inverter, and whose source is tied to ground,
         through which first series circuit said first voltage is grounded; and
      a second series circuit comprising:
         a second diode, whose anode is tied to said second voltage terminal, said second diode for preventing backflow,
         said fourth transistor, whose source is tired to the cathode of said second diode, whose control input is tied to the drain of said fifth transistor, and whose drain is tied to the control input of said second transistor; and
         said sixth transistor, whose drain is tied to the drain of said fourth transistor, whose control input is tied to said voltage select signal and whose source is tied to ground,
         through which second series circuit said second voltage is grounded;
   said first, second, third and fourth transistors are p-channel; and
   said fifth and sixth transistors and n-channel.

* * * * *